(No Model.)
K. MACKAY & T. C. DUNN.
SWIVELING LOOP IRON FOR HARNESS.
No. 298,104.                              Patented May 6, 1884.
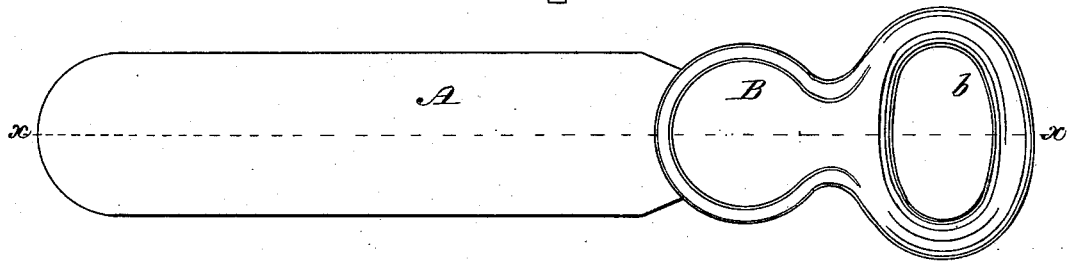
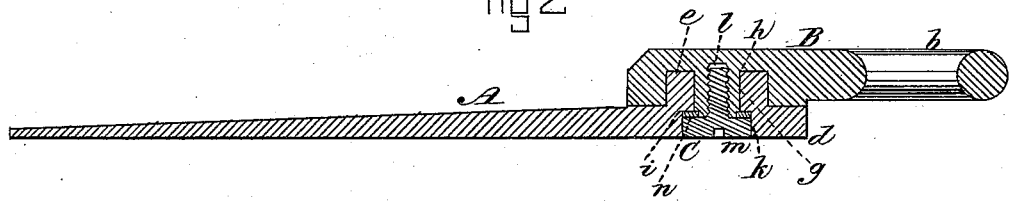
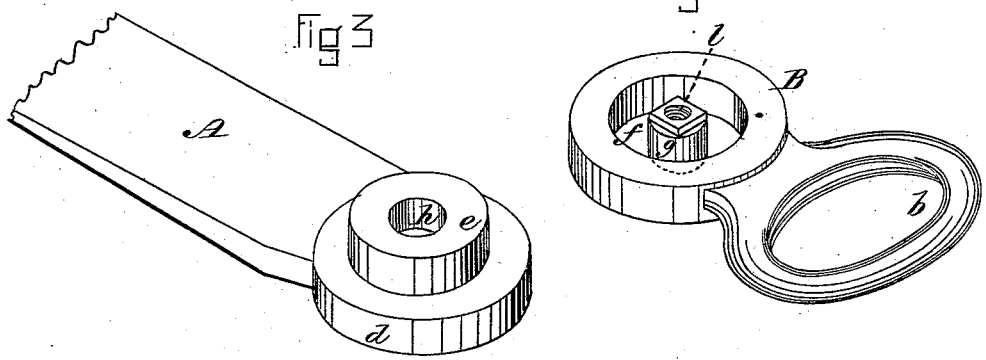
WITNESSES
W. H. Cambridge
Chas. E. Griffin
INVENTORS
Kenneth Mackay
Thaddeus C. Dunn
per T. E. Teschemacher
Atty

UNITED STATES PATENT OFFICE.

KENNETH MACKAY AND THADDEUS C. DUNN, OF BOSTON, MASSACHUSETTS.

SWIVELING LOOP-IRON FOR HARNESS.

SPECIFICATION forming part of Letters Patent No. 298,104, dated May 6, 1884.

Application filed March 14, 1884. (No model.)

*To all whom it may concern:*

Be it known that we, KENNETH MACKAY and THADDEUS C. DUNN, citizens of the United States, residing at Boston, in the county of Suffolk and State of Massachusetts, have invented an Improvement in Swiveling Loop-Irons for Harnesses, of which the following is a full, clear, and exact description, reference being had to the accompanying drawings, making part of this specification, in which—

Figure 1 is a plan of our improved swiveling loop-iron. Fig. 2 is a vertical section of the same on the line $x\,x$ of Fig. 1. Figs. 3 and 4 are views of the two portions of the loop-iron detached.

Our invention relates to an improvement in swiveling loop-irons for harnesses, and has for its object to increase the area of the bearing-surfaces, whereby the friction and wear are reduced to a minimum and play or loose motion avoided; and our invention consists in a joint of novel construction for uniting the stationary and swiveling portions of the loop-iron, as hereinafter particularly set forth.

In the said drawings, A represents the stationary or main portion of the loop-iron, and B the movable portion, which is provided with the usual loop or eye, $b$, and is pivoted in such manner as to swing or swivel upon the stationary portion A, to which it is united by a joint, the construction of which will now be described.

At the center of the circular end $d$ of the portion A is an annular boss or projection, $e$, which fits snugly within a correspondingly-shaped recess, $f$, formed in the inner side of the movable portion B, and from the center of the recess $f$ projects a stud, $g$, which fits snugly within the central aperture, $h$, of the boss $e$, and extends just beyond the level of the shoulder $i$ of the countersink $k$, formed on the inner or rear side of the portion A. The two parts A B of the loop-iron are held together by a fastening-screw, C, which is screwed into a threaded aperture, $l$, in the stud $g$, its head $m$ fitting within the countersink $k$ and lying flush with the rear surface of the portion A. The under surface of the head $m$ bears against a washer, $n$, which fits over the square end of the stud $g$, and is interposed between the under side of the head $m$ and the shoulder $i$; but this washer may be dispensed with, if desired, in which case the length of the stud $g$ would be such as to allow the under side of the screw-head $m$ to take a bearing on the shoulder $i$.

The above-described joint presents many advantages over any other joint hitherto employed in swiveling loop-irons for harnesses, for the reason that two separate and independent bearings are provided, the outer periphery of the annular boss $e$ taking a bearing on the periphery of the recess $f$, while the stud $g$ takes a bearing on the inside of the aperture $h$, an extended area of bearing-surface being thus provided, which reduces the friction to a minimum, materially strengthens the joint, and avoids undue wear and loose motion or play between the moving and stationary parts, while the swiveling loop portion B can be turned or swung into any position without becoming detached from the portion A.

Our improved loop-irons can be secured to a harness-saddle for use in connection with the back-band; or they may be attached to the hames as a means of connecting the traces therewith.

What we claim as our invention, and desire to secure by Letters Patent, is—

1. In a swiveling loop-iron for harnesses, a joint consisting of an annular boss or projection on one portion of the loop-iron, fitting within an annular recess in the other portion, in combination with a stud projecting from the center of said recess and fitting within the annular boss, whereby two separate and independent bearings are secured, and a fastening-screw adapted to enter the stud and hold the two portions of the loop-iron together, substantially as set forth.

2. In a loop-iron for harnesses, the stationary portion A, provided with an annular boss or projection, $e$, in combination with the swiveling loop portion B, provided with an annular recess, $f$, for the reception of the annular boss $e$, and having a stud, $g$, projecting from the center of the recess $f$ into the central aperture, $h$, of the boss $e$, and the fastening-screw C, adapted to enter the stud $g$ from the rear side of the portion A and hold the two portions A B together, all constructed to operate substantially in the manner and for the purpose described.

Witness our hands this 10th day of March, A. D. 1884.

KENNETH MACKAY.
THADDEUS C. DUNN.

In presence of—
P. E. TESCHEMACHER,
W. J. CAMBRIDGE.